US007512107B2

(12) United States Patent
Kang

(10) Patent No.: US 7,512,107 B2
(45) Date of Patent: Mar. 31, 2009

(54) ASYNCHRONOUS MOBILE COMMUNICATION TERMINAL CAPABLE OF SETTING TIME ACCORDING TO PRESENT LOCATION INFORMATION, AND ASYNCHRONOUS MOBILE COMMUNICATION SYSTEM AND METHOD FOR SETTING TIME USING THE SAME

(75) Inventor: Chang-Kyun Kang, Seoul (KR)

(73) Assignee: Samsung Electronics Co., Ltd (KR)

( * ) Notice: Subject to any disclaimer, the term of this patent is extended or adjusted under 35 U.S.C. 154(b) by 662 days.

(21) Appl. No.: 11/010,938

(22) Filed: Dec. 13, 2004

(65) Prior Publication Data

US 2005/0135325 A1 Jun. 23, 2005

(30) Foreign Application Priority Data

Dec. 17, 2003 (KR) ...................... 10-2003-0092368
Oct. 21, 2004 (KR) ...................... 10-2004-0084328

(51) Int. Cl.
*H04J 3/00* (2006.01)

(52) U.S. Cl. ........................ 370/345; 370/328; 370/352

(58) Field of Classification Search ................. 370/252, 370/352; 455/453, 405, 456, 440
See application file for complete search history.

(56) References Cited

U.S. PATENT DOCUMENTS 5,742,905 A * 4/1998 Pepe et al. .................. 455/461
5,933,100 A * 8/1999 Golding ................. 340/995.13
6,366,780 B1 * 4/2002 Obhan ........................ 455/453
6,385,452 B1 * 5/2002 Zadeh et al. ................ 455/440
6,480,470 B1 * 11/2002 Breivik ....................... 370/252
6,593,878 B2 * 7/2003 Fall ......................... 342/357.1
6,771,163 B2 * 8/2004 Linnett et al. ............ 340/309.5
6,775,267 B1 * 8/2004 Kung et al. ................. 370/352
6,782,264 B2 * 8/2004 Anderson ................ 455/456.1
6,789,110 B1 * 9/2004 Short et al. ................. 709/221
7,043,231 B2 * 5/2006 Bhatia et al. ............. 455/412.1
7,158,797 B1 * 1/2007 Jayaraman et al. ....... 455/456.1
7,328,262 B2 * 2/2008 McDonagh et al. ......... 709/224
2003/0028763 A1 * 2/2003 Malinen et al. ............ 713/155
2003/0064712 A1 * 4/2003 Gaston et al. .............. 455/414
2003/0065738 A1 * 4/2003 Yang et al. .................. 709/215

(Continued)

FOREIGN PATENT DOCUMENTS

CN 1172570 2/1998

(Continued)

*Primary Examiner*—Thong H Vu
(74) *Attorney, Agent, or Firm*—The Farrell Law Firm, PC

(57) ABSTRACT

An asynchronous mobile communication terminal for setting present time. A memory stores information of a time information server providing present time information location by location. A communicator performs communication with the time information server through a base station providing present location information. A time setting module carries out an update operation based on the location information provided from the base station and the time information provided from the time information server corresponding to the location information and sets the present time. A controller receives the location information from the base station, sends a request for time information corresponding to the location information to the time information server through the communicator, and controls the time setting module so that the update operation can be carried out using the location information and the time information provided from the time information server corresponding to the location information.

21 Claims, 5 Drawing Sheets

U.S. PATENT DOCUMENTS

| | | | | |
|---|---|---|---|---|
| 2003/0135484 | A1 * | 7/2003 | Gesek | 707/1 |
| 2004/0136358 | A1 * | 7/2004 | Hind et al. | 370/352 |
| 2005/0107066 | A1 * | 5/2005 | Erskine et al. | 455/405 |
| 2006/0025157 | A1 * | 2/2006 | Kuwahara et al. | 455/456.1 |
| 2006/0233132 | A1 * | 10/2006 | Lee | 370/328 |

FOREIGN PATENT DOCUMENTS

| | | |
|---|---|---|
| CN | 1340952 | 3/2002 |
| CN | 1414812 | 4/2003 |

* cited by examiner

ASYNCHRONOUS MOBILE COMMUNICATION TERMINAL CAPABLE OF SETTING TIME ACCORDING TO PRESENT LOCATION INFORMATION, AND ASYNCHRONOUS MOBILE COMMUNICATION SYSTEM AND METHOD FOR SETTING TIME USING THE SAME

PRIORITY

This application claims priority to applications entitled "ASYNCHRONOUS MOBILE COMMUNICATION TERMINAL CAPABLE OF SETTING TIME ACCORDING TO PRESENT LOCATION INFORMATION, AND ASYNCHRONOUS MOBILE COMMUNICATION SYSTEM AND METHOD FOR SETTING TIME USING THE SAME", filed in the Korean Intellectual Property Office on Dec. 17, 2003 and on Oct. 21, 2004, and assigned Serial Nos. 2003-92368 and 2004-84328, respectively, the contents of which are hereby incorporated by reference.

BACKGROUND OF THE INVENTION

1. Field of the Invention

The present invention relates generally to a method for automatically inputting time information in a mobile communication terminal, and more particularly to a method for automatically inputting time information in a mobile communication terminal that can automatically set time in an asynchronous mobile communication terminal based on the GSM (Global System for Mobile Communication)/GPRS (General Packet Routing Service).

2. Description of the Related Art

Conventionally, a terminal based on the GSM (Global System for Mobile Communication)/GPRS (General Packet Routing Service) in an asynchronous mobile communication system is designed such that time information can be displayed using an internally embedded RTC (Real Time Clock), different from a synchronous CDMA (Code Division Multiple Access) terminal. Accordingly, a user must initially input time information into the GSM/GPRS-based terminal in the asynchronous mobile communication system. Further, users are inconvenienced because they must again set time information whenever the GSM/GPRS-based terminal is switched from a power-off state to a power-on state in the asynchronous mobile communication system.

A synchronous CDMA terminal in a synchronous mobile communication system automatically receives and sets time information from a base station during a terminal setup operation. In this system, the user does not need to directly input the time information into the synchronous CDMA terminal, because time of each terminal is automatically set according to time information transmitted from the base station.

However, because the base station does not transmit time information to the asynchronous GSM/GPRS-based terminal and each terminal user directly inputs the time information if desired, the time information may not be the same in each of the terminals. When the asynchronous GSM/GPRS-based terminal is used, users are inconvenienced because they listen to a present time provided by speech through an ARS (Auto Response System) and manually set a time when not holding a watch.

Moreover, whenever time information is reset as the power of a backup battery is discharged from the asynchronous GSM/GPRS-based terminal, or the terminal is moved to a region having a different time zone, there is a problem in that the user must manually manipulate the terminal, i.e., manually reset the time.

SUMMARY OF THE INVENTION

Therefore, the present invention has been designed in view of the above and other problems, and it is one object of the present invention to provide an asynchronous mobile communication terminal based on the GSM (Global System for Mobile Communication)/GPRS (General Packet Routing Service) capable of easily setting a time, and an asynchronous mobile communication system and method for setting time using the same.

It is another object of the present invention to provide an asynchronous mobile communication terminal based on the GSM (Global System for Mobile Communication)/GPRS (General Packet Routing Service) capable of easily setting a time of a corresponding region when the asynchronous mobile communication terminal is moved to a region having a different time zone, and an asynchronous mobile communication system and method for setting time using the same.

In accordance with one aspect of the present invention, the above and other objects can be accomplished by an asynchronous mobile communication terminal for setting a present time, comprising: a memory for storing information of a time information server providing present time information location by location; a communicator for performing communication with the time information server through a base station providing present location information; a time setting module for carrying out an update operation based on the location information provided from the base station and the time information provided from the time information server corresponding to the location information and setting the present time; and a controller for receiving the location information from the base station, sending a request for time information corresponding to the location information to the time information server through the communicator, and controlling the time setting module so that the update operation can be carried out based on the location information and the time information provided from the time information server corresponding to the location information.

In accordance with another aspect of the present invention, an asynchronous mobile communication system for setting present time, comprises: a time information server for providing present time information when receiving a time information request signal; a base station for transmitting location information to a cell covered thereby, transmitting the received time information request signal to the time information server, and receiving and transmitting the present time information provided from the time information server; and a mobile communication terminal for updating present location according to the location information transmitted from the base station, transmitting the time information request signal corresponding to the updated location information to the time information server through the base station when a time setting request command is input, and updating the present time to the time information transmitted from the time information server through the base station.

In accordance with yet another aspect of the present invention, a time setting method using an asynchronous mobile communication system, which includes a base station for transmitting location information, a time information server for transmitting present time information and a mobile communication terminal, the method comprises: updating present location information according to location information transmitted from the base station; when a command requesting time setting associated with the updated location information is input, transmitting a time information request signal corresponding to the present location information to the time information server through the base station; and updating present time to the present time information transmitted from the time information server responding to the time information request signal.

According to the above-described aspects of the present invention, an ARS telephone number of a time information server stored according to the time setting command is retrieved, a dialing operation based on the retrieved ARS telephone number is automatically performed, and present time is set on the basis of the time information provided from the time information server, such that the asynchronous mobile communication terminal can correctly set present time through a simple manipulation.

Moreover, the asynchronous mobile communication terminal updates present location information on the basis of location information provided from the base station, automatically requests that the time information server provide present time information corresponding to the newly updated location information when the newly updated location information is different from location information in a set time zone, and newly sets present time on the basis of the provided time information, such that a present time setting operation can be conveniently processed in the asynchronous mobile communication terminal.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Figure 1:
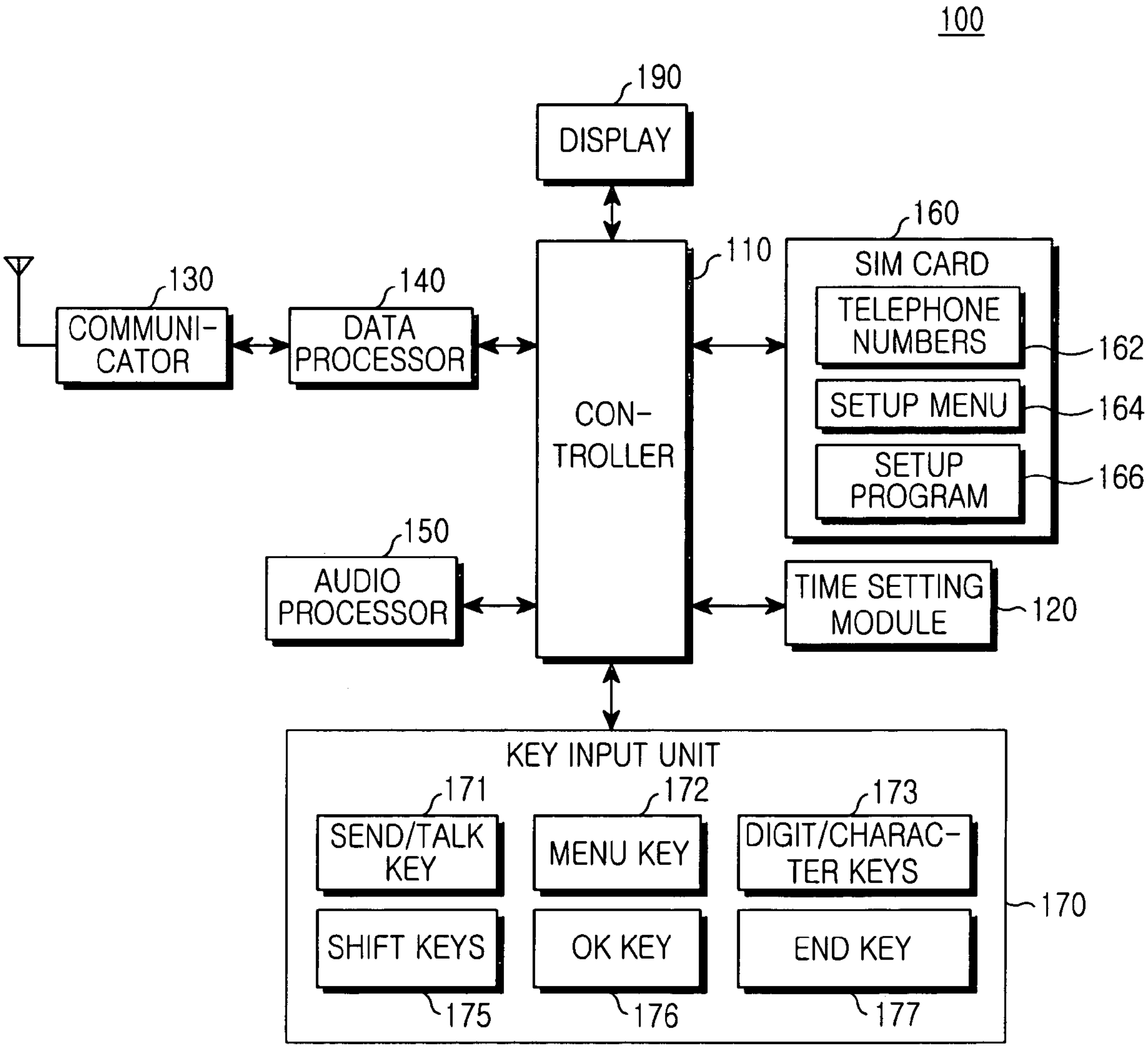
FIG. 1 is a block diagram illustrating an asynchronous mobile communication terminal in accordance with a preferred embodiment of the present invention.

Preferred embodiments of the present invention will be described in detail herein below with reference to the annexed drawings. In the drawings, the same or similar elements are denoted by the same reference numerals even though they are depicted in different drawings.

In the following description made in conjunction with preferred embodiments of the present invention, a variety of specific elements are shown. The description of such elements has been made only for a better understanding of the present invention. Those skilled in the art will appreciate that the present invention can be implemented without using the above-mentioned specific elements.

Additionally, in the following description, a detailed description of known functions and configurations incorporated herein will be omitted when it may make the subject matter of the present invention rather unclear.

FIG. 1 is a block diagram illustrating an asynchronous mobile communication terminal in accordance with a preferred embodiment of the present invention. Referring to FIG. 1, a communicator 130 performs a wireless communication function in a mobile communication terminal 100. The communicator 130 comprises an RF (Radio Frequency) transmitter for carrying out a frequency up-conversion operation for a signal to be transmitted and amplifying the up-converted signal, and an RF receiver for low-noise amplifying a received signal and down-converting the amplified signal, etc.

A data processor 140 can comprise a modem for modulating a signal to be transmitted by the communicator 130 and demodulating a signal received by the communicator 130, and a codec for encoding the signal to be transmitted by the communicator 130 and decoding the signal received by the communicator 130. Here, the codec comprises a data codec for processing packet data, etc., and an audio codec for processing an audio signal such as speech.

An audio processor 150 reproduces a received audio signal output from the audio codec of the data processor 140 to output the reproduced signal through a speaker (not shown) or transmits an audio signal input from a microphone (not shown) to the audio codec of the data processor 140.

A controller 110 controls an overall operation of the mobile communication terminal 100. Moreover, the controller 110 starts a setup program 166 stored in an SIM (Subscriber Identity Module) card 160 fitted in the mobile communication terminal, and executes a corresponding operation according to an input execution command. Further, the controller 110 can store, in the SIM card 160, a received or input telephone number according to an input storing command.

A display unit 190 displays an operating state of the mobile communication terminal 100, and displays time information set in the mobile communication terminal 100, under the control of the controller 110.

A key input unit 170 includes, for example, a SEND/TALK key 171, a menu key 172, digit/character keys 173, shift keys 175, an OK key 176, and an END key 177. The SEND/TALK key 171 is used for inputting a SEND/TALK command. The menu key 172 is used for performing and setting a corresponding operation and confirming setup information. The digit/character keys 173 include a plurality of keys provided for inputting digits and characters. When a selection signal of the menu key 172 is input, the controller 110 detects a registered setup menu 164 from the SIM card 160 and controls the display unit 190 to display the detected menu.

The shift keys 175 are used for shifting a cursor or bar for selecting an item of the menu displayed on a screen. The OK key 176 is used for performing a corresponding operation mapped to the menu item displayed and selected according to a signal input from the menu key 172 and storing changed setup information associated with a corresponding operation. The END key 177 is used for ending an operation being currently performed.

The SIM card 160 stores items of the setup menu 164 serving as the guidance menu for executing a program necessary for the operation of the mobile communication terminal or changing or newly registering program setup. Further, the SIM card 160 stores a setup program 166 serving as a program set through the key input unit 170 for the setup menu 164. The SIM card 160 also stores telephone numbers 162 according to an input storing command.

A time setting module 120 is used for setting time in the mobile communication terminal in accordance with the present invention. The time setting module 120 resets time information according to a present time update command and sets the present time. The controller 110 controls the display unit 190 to display the present time set by the time setting module 120.

When the menu key 172 is selected and a time setting command is input, the controller 110 retrieves, from the SIM card 160 storing telephone numbers 162, an ARS (Auto Response System) telephone number of a server (not shown) that provides time information of a corresponding region. At this point, the time setting command can be set so that a time setting menu registered in the SIM card 164 can be selected using the menu key 172 provided in the key input unit 170. A dedicated hot key for inputting the time setting command can be provided in the key input unit 170.

When the ARS telephone number of the server providing the time information is retrieved according to the time setting command, the controller 110 automatically performs a dialing operation using the communicator 130 to request that the time information server provides present time information registered according to the retrieved ARS telephone number, through a base station (not shown).

When the present time information is received from the time information server through the base station, the controller 110 provides the received present time information to the time setting module 120. The time setting module 120 resets currently set time and sets the present time on the basis of the present time information provided by the controller 110. When the present time is newly set through the time setting module 120, the controller 110 controls the display unit 190 to display the newly set present time and terminates a call connection with the time information server through the base station by means of the communicator 130.

Typically, the time information provided by the time information server is a speech signal. In accordance with the present invention, the base station converts the speech signal representing the time information provided by the time information server into a data format that is processable in the mobile communication terminal, and then transmits the converted signal to the mobile communication terminal.

Figure 2:
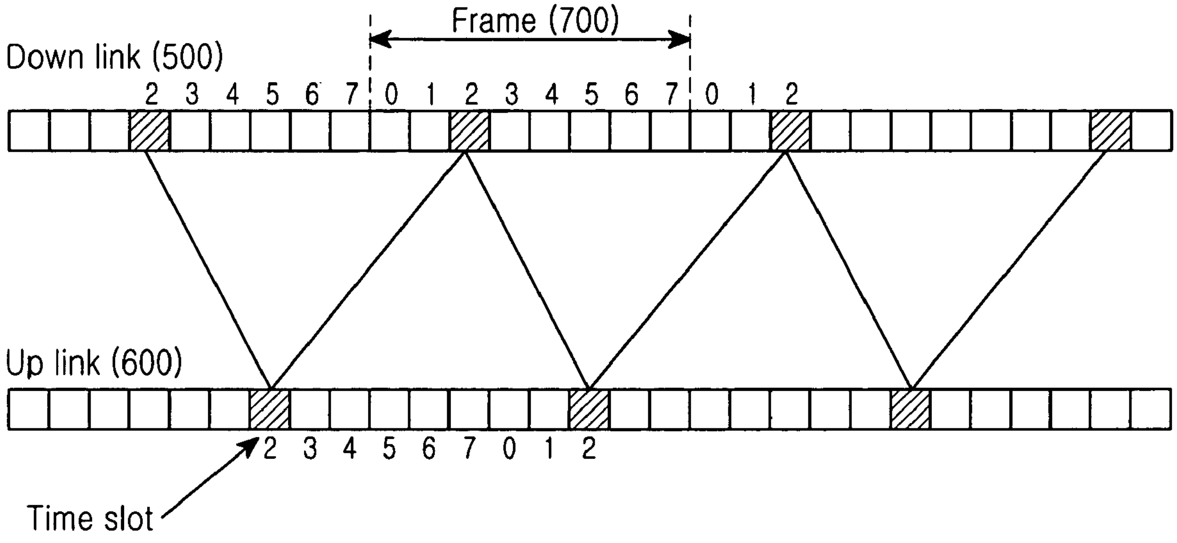
FIG. 2 illustrates a link structure for transmitting time information in accordance with the present invention.

FIG. 2 illustrates a link structure for transmitting time information in accordance with the present invention. Referring to FIG. 2, the TCH is formed after a call is established. When the TCH is formed, a downlink 500 and an uplink 600 are formed. The downlink 500 and the uplink 600 use different frequency bands, but use the same time slot and the same channel number. When compared with the downlink 500, the uplink 600 is delayed by a cycle of 3 time slots.

A frame 700 includes 8 time slots. Seven of the time slots, i.e., all the time slots except for Time Slot 0, are used by the TCH when data is transmitted.

Figure 3:
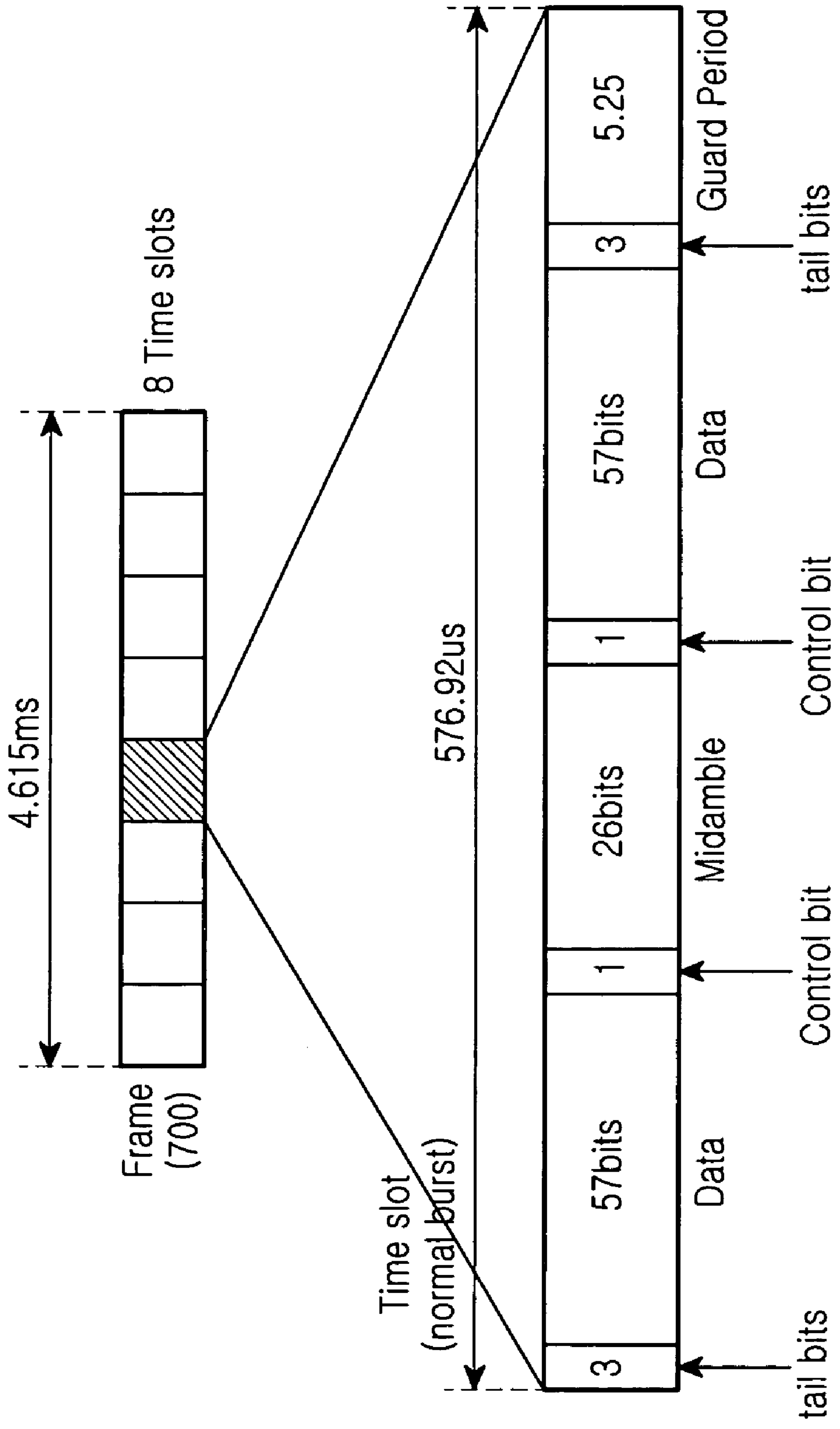
FIG. 3 illustrates a time slot structure for storing time information in accordance with the present invention.

FIG. 3 illustrates a time slot structure for storing time information in accordance with the present invention. Referring to FIG. 3, 114 bits of data can be stored in one time slot, along with 2 control bits, 26 midamble bits, 6 tail bits, and a guard period of 5.25 bits. Because the capacity necessary for storing the time information is a minimum of 48 bits, the time information provided by the time information server can be sufficiently stored in one time slot.

The base station stores the time information provided by the time information server in the time slot, and transmits the time information to the mobile communication terminal using the TCH. Therefore, the mobile communication terminal receives and decodes data including the time information transmitted from the base station, and then provides the decoded time information to the time setting module 120.

As a result, the ARS telephone number of the time information server stored in the SIM card 160 is retrieved according to the time setting command and an automatic dialing operation is performed. Subsequently, present time is set using the time information provided from the time information server, such that the asynchronous mobile communication terminal can correctly set the present time through a simple manipulation.

Figure 4:
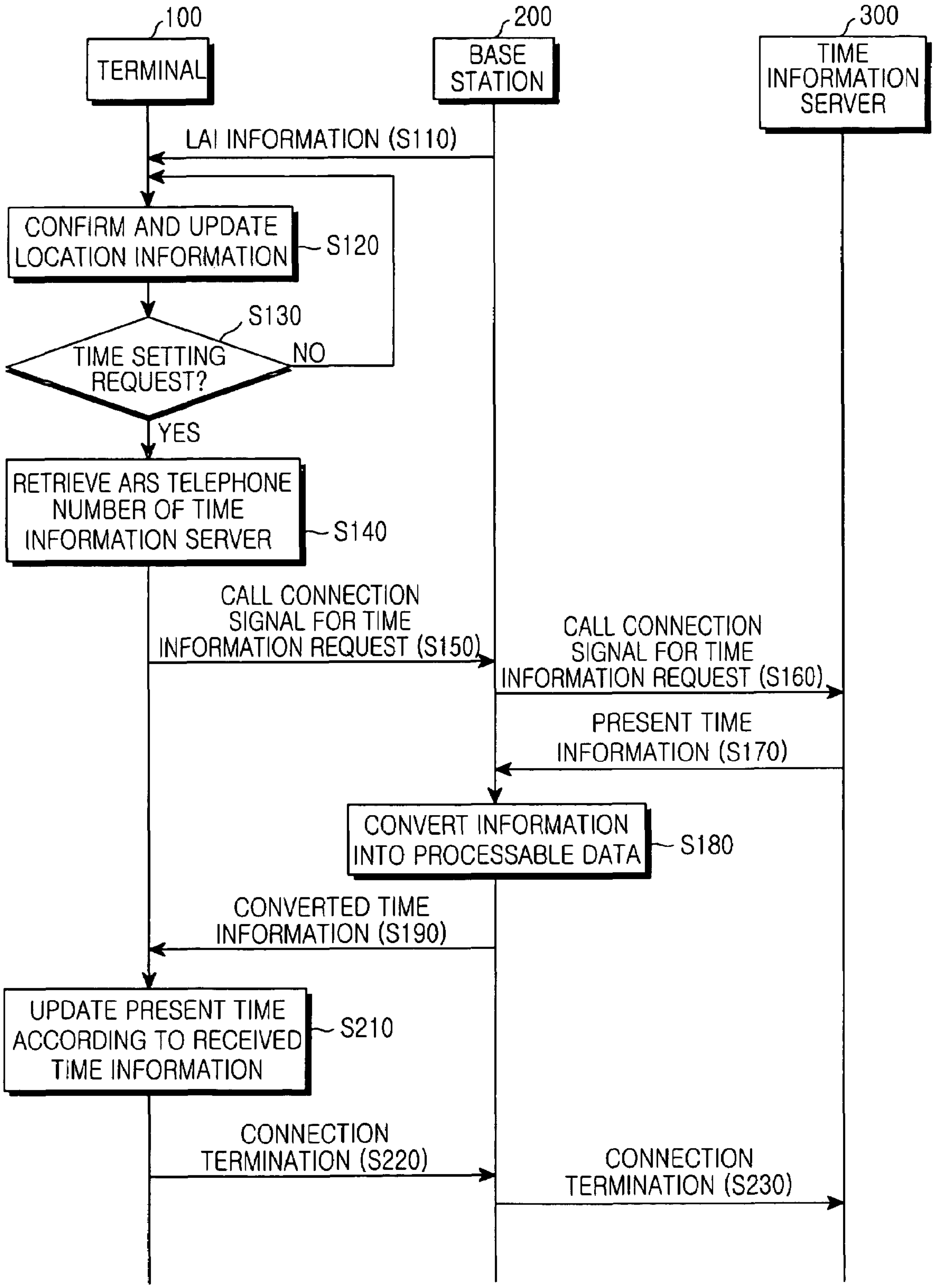
FIG. 4 is a flow chart illustrating a first embodiment of a time setting method using the asynchronous mobile communication terminal in accordance with the present invention.

FIG. 4 is a flow chart illustrating a first embodiment of a time setting method using the asynchronous mobile communication terminal in accordance with the present invention. In step S110, a base station 200 transmits LAI (Location Area Identification) information of a corresponding cell area covered thereby through a BCH (Broadcast CHannel). The LAI information is used when information of a region in which a terminal 100 is located is updated. This LAI information includes an MMC (Mobile Malicious Code), an MNC (Mobile Network Code), and an LAC (Location Area Code).

To ensure that time information is received from the time information server region by region in accordance with an embodiment of the present invention, ARS telephone numbers of time information servers in corresponding regions are stored in the SIM card 160 when the mobile communication terminal is produced. If desired, a new ARS telephone number can be registered, and the ARS telephone number can be included in location information provided from the base station 200.

Upon receiving location information from the base station 200, the controller 110 provided in the asynchronous mobile communication terminal 100 confirms the received location information, compares the received location information with location information set in the present time setting module 120, and newly updates the location information in the time setting module 120 according to a result of the comparison in step S120. At this point, the location information is stored in the time setting module 120. The location information is newly updated on the basis of newly received location information.

When the currently set location information is different from the location information received from the base station 200, the controller 110 determines whether a time setting command has been input in step S130. If the time setting command has been received, the controller 110 retrieves an ARS telephone number of a time information server 300 set in current location from the SIM card 160 in step S140.

When the ARS telephone number of the time information server set according to the newly updated location information is retrieved, the controller 110 transmits a call connection signal to the base station 200 in order request present time information based on the retrieved ARS telephone number in step S150. The base station 200 transmits, to the time information server 300, the call connection signal for the present time information request transmitted from the mobile communication terminal 100 in step S160.

Upon receiving the call connection signal for the present time information request, the time information server 300 transmits the present time information to the base station 200 in step S170. At this point, the transmitted present time information is a speech signal and/or data signal.

Upon receiving the present time information from the time information server 300, the base station 200 converts the received present time information into format data processable in the mobile communication terminal 100 in step S180. The base station 200 stores data including the converted present time information in a time slot and transmits the data to the mobile communication terminal 100 using a TCH (Traffic Channel) as described in FIGS. 2 and 3, in step S190.

Upon receiving the data including the present time information from the base station 200, the mobile communication terminal 100 controls the time setting module 120 such that the present time information is detected from the received data and the present time can be updated using the detected present time information in step S210. Therefore, the time setting module 120 resets the set time information by updating the time information using the present time information provided from the controller 110.

When the present time is newly updated, the controller 110 terminates a call connection with the time information server 300 through the base station 200 in steps S220 and S230.

Accordingly, the asynchronous mobile communication terminal updates present location information using location information provided from the base station, automatically requests that the time information server provide present time information corresponding to the newly updated location information, and newly sets present time using the provided time information, such that a present time setting operation can be conveniently processed in the asynchronous mobile communication terminal.

Figure 5:
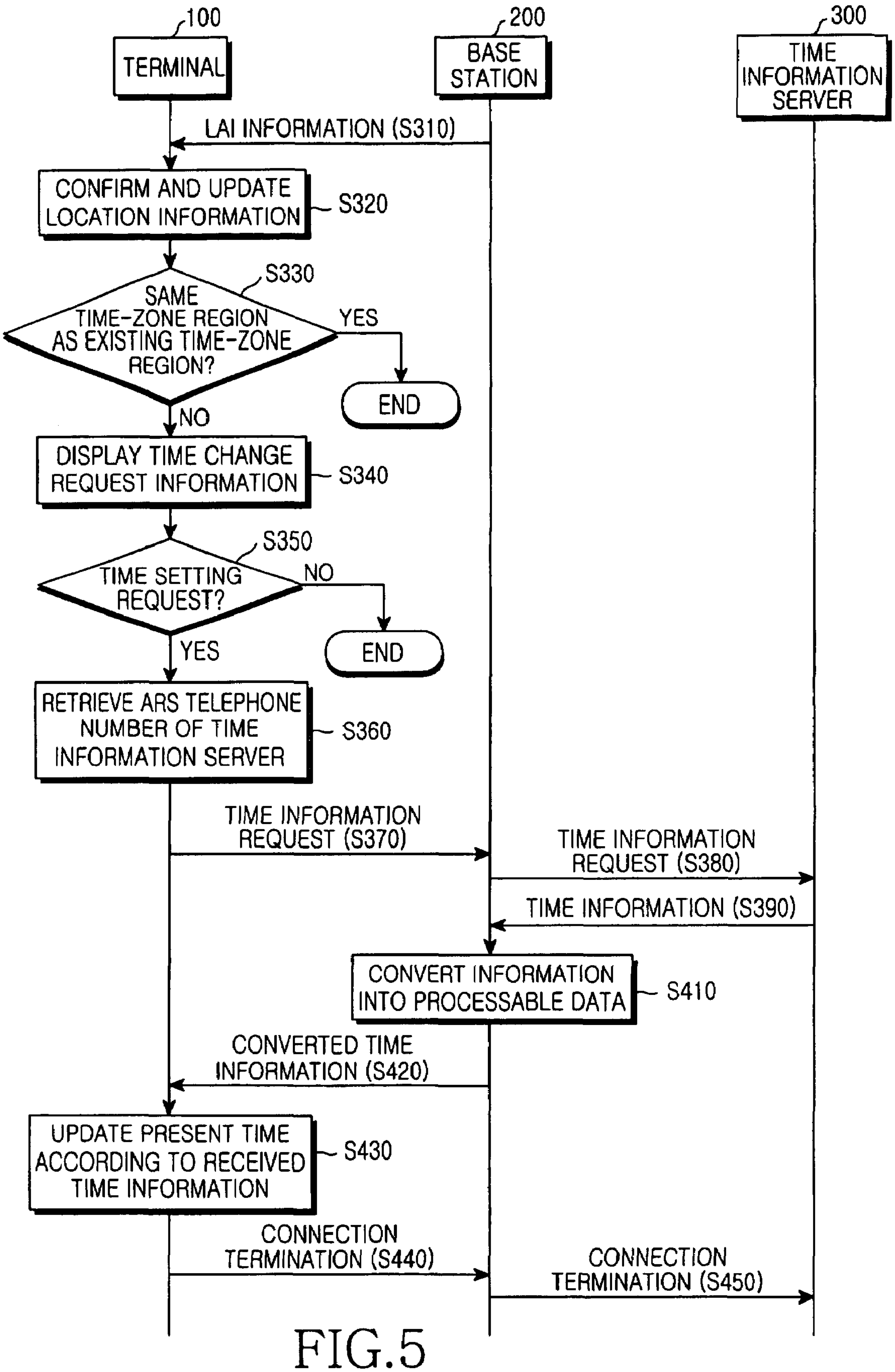
FIG. 5 is a flow chart illustrating a second embodiment of the time setting method using the asynchronous mobile communication terminal in accordance with the present invention.

FIG. 5 is a flow chart illustrating a second embodiment of the time setting method using the asynchronous mobile communication terminal in accordance with the present invention. For reference, the second embodiment of the time setting method in accordance with the present invention is to conveniently set present time when moving between different time zones.

Referring to FIG. 5, the base station 200 transmits LAI (Location Area Identification) information of a corresponding cell area covered thereby through a BCH (Broadcast CHannel) in step S310. Here, the LAI information includes an MMC (Mobile Malicious Code), an MNC (Mobile Network Code), and an LAC (Location Area Code).

As indicated above, to ensure that time information is received from the time information server region by region in accordance with an embodiment of the present invention, ARS telephone numbers of time information servers in corresponding regions are stored in the SIM card 160 when the mobile communication terminal is produced. If desired, a new ARS telephone number can be registered, and the ARS telephone number can be included in location information provided from the base station 200.

When location information is received from the base station 200, the controller 110 provided in the asynchronous mobile communication terminal 100 confirms the received location information, compares the received location information with location information set in the present time setting module 120, and newly updates the location information in the time setting module 120 according to a result of the comparison in step S320.

When the currently set location information set in the time setting module 120 is different from the location information received from the base station 200, the controller 110 controls the display unit 190 to display information indicating a request necessary for changing the time set in the time setting module in step S340. The controller 110 determines whether a command has been input in response to the time change request information displayed on the display unit 190 in step S350. Upon determining that a time setting command for changing the time has been received, the controller 110 retrieves an ARS telephone number of a time information server set in a region of a current time zone from the SIM card 160 in step S360. However, when the controller 110 receives the ARS telephone number of the time information sever set in the current time zone from the base station 200, the received ARS telephone number is newly registered in the SIM card 160.

When the ARS telephone number of the time information server set using the newly updated location information is retrieved, the controller 110 transmits a call connection signal to the base station 200 in order to make a request for present time information based on the retrieved ARS telephone number in step S370. The base station 200 transmits, to the time information server 300 associated with the ARS telephone number, the call connection signal for making a request for the present time information transmitted from the mobile communication terminal 100 in step S380.

When the time information server 300 receives the call connection signal for the present time information request, the present time information is transmitted to the base station 200 in step S390. At this point, the present time information transmitted from the time information server 300 can be a speech signal and/or data signal.

Upon receiving the present time information from the time information server 300, the base station 200 converts the received present time information into format data that is processable in the mobile communication terminal 100 in step S410. The base station 200 stores data including the converted present time information in a time slot and transmits the data to the mobile communication terminal 100 using a TCH as described in FIGS. 2 and 3, in step S420.

Upon receiving the data including the present time information from the base station 200, the mobile communication terminal 100 controls the time setting module 120 such that the present time information is detected from the received data and the present time can be updated using the detected present time information. Therefore, the time setting module 120 resets the set time information by updating the time information using the present time information provided from the controller 110 in step S430.

When the present time is newly updated, the controller 110 terminates a call connection with the time information server 300 through the base station 200 in steps S440 and S450.

Accordingly, the asynchronous mobile communication terminal updates present location information using location information provided from a base station, automatically requests that a time information server provide present time information corresponding to the newly updated location information, when the newly updated location information is different from location information in a set time zone, and newly sets present time using the provided time information, such that a present time setting operation can be conveniently processed in the asynchronous mobile communication terminal.

As is apparent from the above description, an ARS (Auto Response System) telephone number of a time information server stored according to a time setting command is retrieved, a dialing operation based on the retrieved ARS telephone number is automatically performed, and present time is set using the time information provided from the time information server, such that the asynchronous mobile communication terminal can correctly set present time through a simple manipulation.

Although the preferred embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. An asynchronous mobile communication terminal for setting a present time, comprising:

a memory for storing information from a time information server that provides present time information based on a location;

a communicator for communicating with the time information server through a base station that provides present location information;

a time setting module updating the present time based on the location information provided from the base station and the time information provided from the time information server corresponding to the location information; and a controller for receiving the location information from the base station, sending a request for the time information corresponding to the location information to the time information server via the communicator, and controlling the time setting module.

2. The asynchronous mobile communication terminal according to claim 1, wherein the memory is an SIM (Subscriber Identity Module) card.

3. The asynchronous mobile communication terminal according to claim 1, wherein the information from the time information server is an ARS (Auto Response System) telephone number set location by location.

4. The asynchronous mobile communication terminal according to claim 3, wherein the controller dials the ARS telephone number when sending a time information request to the time information server.

5. The asynchronous mobile communication terminal according to claim 3, wherein the ARS telephone number is included in the location information provided from the base station.

6. The asynchronous mobile communication terminal according to claim 1, wherein the controller displays time change request information when the provided location information is different from location information associated with time preset in the time setting module, and sends a request for time information corresponding to the updated location information to the time information server.

7. An asynchronous mobile communication system for setting a present time, comprising:

a time information server for providing present time information after receiving a time information request signal;

a base station for transmitting location information, transmitting the time information request signal to the time information server, and receiving and transmitting the present time information provided from the time information server; and a mobile communication terminal for updating a present location according to the location information transmitted from the base station, transmitting the time information request signal corresponding to the updated location information to the time information server through the base station, when a time setting request command is input, and updating the present time using the time information transmitted from the time information server through the base station.

8. The asynchronous mobile communication system according to claim 7, wherein the time information request signal is a dialing signal of an ARS (Auto Response System) telephone number set in the time information server.

9. The asynchronous mobile communication system according to claim 8, wherein the ARS telephone number of the time information server is stored in an SIM (Subscriber Identity Module) card provided in the mobile communication terminal.

10. The asynchronous mobile communication system according to claim 8, wherein the ARS telephone number of the time information server is included in the location information provided from the base station.

11. The asynchronous mobile communication system according to claim 8, wherein the base station converts the time information into a format that is processable in the mobile communication terminal, and transmits the converted information to the mobile communication terminal.

12. The asynchronous mobile communication system according to claim 11, wherein the base station stores the received time information in a time slot to be transmitted by a traffic channel generated after a call is established, and transmits the received time information to the mobile communication terminal.

13. The asynchronous mobile communication system according to claim 7, wherein the time information provided from the time information server is a signal having at least one of a speech signal format and a data signal format.

14. A time setting method in an asynchronous mobile communication system including a base station for transmitting location information, a time information server for transmitting present time information, and a mobile communication terminal, the method comprising:

updating present location information according to the location information transmitted from the base station;

when a command requesting time setting associated with the updated location information is input, transmitting a time information request signal corresponding to the present location information to the time information server through the base station; and updating the present time using the present time information transmitted from the time information server responding to the time information request signal.

15. The time setting method according to claim 14, wherein the time information request signal is a dialing signal of an ARS (Auto Response System) telephone number set in the time information server.

16. The time setting method according to claim 15, wherein the ARS telephone number of the time information server is stored in an SIM (Subscriber Identity Module) card provided in the mobile communication terminal.

17. The method according to claim 15, wherein the ARS telephone number of the time information server is included in the location information provided from the base station.

18. The time setting method according to claim 15, further comprising:

converting, by the base station, the transmitted time information into a format that is processable in the mobile communication terminal, and transmitting the converted information to the mobile communication terminal.

19. The time setting method according to claim 18, wherein the time information provided from the time information server is a signal having at least one of a speech signal format and a data signal format.

20. The time setting method according to claim 18, wherein the base station stores the received time information in a time slot to be transmitted by a traffic channel generated after a call is established, and transmits the received time information to the mobile communication terminal.

21. The time setting method according to claim 14, further comprising:

displaying time change request information when the transmitted location information is different from location information associated with time preset in the time setting module; and sending a request for time information corresponding to the updated location information to the time information server.

* * * * *